(12) United States Patent
Ahmed et al.

(10) Patent No.: US 10,346,201 B2
(45) Date of Patent: Jul. 9, 2019

(54) GUIDED VIRTUAL MACHINE MIGRATION (71) Applicant: International Business Machines Corporation, Armonk, NY (US)

(72) Inventors: Syed R. Ahmed, Bangalore (IN); Muralikrishna Nidugala, Bangalore (IN); Praveen K. R. Pallamparti, Hyderabad (IN); Venkatesh Sainath, Bangalore (IN); Dhavalkumar M. Thakar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/182,986

(22) Filed: Jun. 15, 2016

(65) Prior Publication Data

US 2017/0364387 A1 Dec. 21, 2017

(51) Int. Cl.
*G06F 9/455* (2018.01)
*G06F 9/48* (2006.01)
*G06F 3/06* (2006.01)
*H04L 12/24* (2006.01)

(52) U.S. Cl.
CPC .......... *G06F 9/4856* (2013.01); *G06F 3/0605* (2013.01); *G06F 3/067* (2013.01); *G06F 3/0647* (2013.01); *G06F 3/0664* (2013.01); *H04L 41/12* (2013.01); *H04L 41/147* (2013.01)

(58) Field of Classification Search
CPC .................................................. G06F 9/45533
USPC .......................................................... 718/1
See application file for complete search history.

(56) References Cited

U.S. PATENT DOCUMENTS

| | | | |
|---|---|---|---|
| 8,095,929 B1 * | 1/2012 | Ji | G06F 9/4856 709/223 |
| 8,230,069 B2 | 7/2012 | Korupolu | |
| 8,364,460 B2 * | 1/2013 | Ostermeyer | G06F 17/5009 703/13 |
| 8,489,744 B2 | 7/2013 | Elyashev et al. | |
| 8,782,322 B2 | 7/2014 | Houlihan et al. | |
| 2007/0260417 A1 * | 11/2007 | Starmer | G01K 7/425 702/136 |

(Continued)

OTHER PUBLICATIONS

Epping, "DRS Deepdive", Yellow Bricks, printed on Apr. 7, 2016, 6 pages, <http://www.yellow-bricks.com/drs-deepdive/>.

(Continued)

*Primary Examiner* — Mehran Kamran
(74) *Attorney, Agent, or Firm* — Christopher K. McLane; Maeve M. Carpenter (57) ABSTRACT

In an approach to guided virtual machine migration, one or more computer processors determine a target host computer available for a migration of a virtual machine from a source host computer. The one or more computer processors identify one or more resources of the target host computer with one or more predictive errors. The one or more computer processors determine whether the virtual machine uses one or more of the identified one or more resources with one or more predictive errors. The one or more computer processors rank a migration path for the virtual machine from the source host computer to the target host computer with a designation. The one or more computer processors create a target host map, wherein the target host map indicates at least one migration path for the virtual machine from the source host computer to the target host computer.

20 Claims, 6 Drawing Sheets

(56) References Cited

U.S. PATENT DOCUMENTS

| | | | |
|---|---|---|---|
| 2009/0228589 A1* | 9/2009 | Korupolu | H04L 67/1097 709/226 |
| 2010/0005465 A1* | 1/2010 | Kawato | G06F 9/455 718/1 |
| 2010/0115512 A1* | 5/2010 | Sakai | G06F 8/65 718/1 |
| 2010/0332657 A1* | 12/2010 | Elyashev | H04L 67/1002 709/226 |
| 2011/0055605 A1* | 3/2011 | Jackson | G06F 1/3203 713/320 |
| 2011/0107332 A1* | 5/2011 | Bash | G06F 1/206 718/1 |
| 2011/0219372 A1* | 9/2011 | Agrawal | G06F 9/45558 718/1 |
| 2011/0289205 A1* | 11/2011 | Hansson | G06F 9/5077 709/224 |
| 2012/0011254 A1* | 1/2012 | Jamjoom | G06F 9/4856 709/226 |
| 2012/0030346 A1* | 2/2012 | Fukuda | G06F 11/0709 709/224 |
| 2012/0137001 A1* | 5/2012 | Ferris | H04W 4/003 709/226 |
| 2013/0346973 A1* | 12/2013 | Oda | G06F 9/4856 718/1 |
| 2014/0189685 A1* | 7/2014 | Kripalani | G06F 9/45533 718/1 |
| 2014/0320502 A1* | 10/2014 | Fletcher | G06T 11/206 345/440.2 |
| 2015/0007177 A1* | 1/2015 | Tobo | G06F 9/45533 718/1 |
| 2015/0007178 A1* | 1/2015 | Kaneko | G06F 9/5088 718/1 |
| 2015/0347174 A1* | 12/2015 | Song | G06F 9/45558 718/1 |
| 2016/0004552 A1* | 1/2016 | Innan | G06F 9/5088 718/1 |
| 2016/0004582 A1* | 1/2016 | Nagura | H04L 41/0663 714/15 |
| 2016/0139944 A1* | 5/2016 | Rouwet | G06F 9/45558 718/1 |
| 2016/0291997 A1* | 10/2016 | Bernal | G06F 9/45558 |
| 2016/0306727 A1* | 10/2016 | Kato | G06F 11/3428 |
| 2016/0321113 A1* | 11/2016 | Pinto | G06F 9/45533 |
| 2017/0046236 A1* | 2/2017 | Borkenhagen | G06F 11/203 |
| 2017/0102960 A1* | 4/2017 | Dwarampudi | G06F 9/45558 |
| 2017/0109205 A1* | 4/2017 | Ahuja | G06F 9/505 |
| 2017/0286142 A1* | 10/2017 | Palermo | G06F 9/45558 |

OTHER PUBLICATIONS

"Hyper-V: Using Live Migration with Cluster Shared Volumes in Windows Server 2008 R2", updated: Apr. 27, 2011, 18 pages, <http://technet.microsoft.com/en-us/library/dd446679(v=ws.10).aspx>.

Li et al., "Improving Cloud Survivability through Dependency based Virtual Machine Placement", printed on Apr. 7, 2016, 6 pages, <http://www.people.vcu.edu/~xhe2/publications/Conferences/Li-Secrypt12.pdf>.

"Live Partition Mobility Setup Checklist", IBM Redbooks, Power Systems, last updated on Aug. 11, 2015, 9 pages, <http://www.redbooks.ibm.com/Redbooks.nsf/RedbookAbstracts/tips1184.html?Open>.

"22.1 Policy-based VM Migration", printed on Apr. 7, 2016, 4 pages, <http://docs.adaptivecomputing.com/mwm/7.0/Content/topics/vm/policy_based_vm_migration.html>.

"Preparing the source and destination Virtual I/O Server logical partitions for partition mobility", IBM Knowledge Center, printed on Apr. 7, 2016, 3 pages, <http://www.ibm.com/support/knowledgecenter/POWER8/p8hc3/p8hc3_hmcprepvios.htm?cp=POWER8%2F1-6-1-3-7-1-1-2>.

"12.5 Setting Migration Priority", Copyright 2016 RedHat, Inc., printed on Apr. 7, 2016, 3 pages, <https://access.redhat.com/documentation/en-US/Red_Hat_Enterprise_Virtualization/3.0/html/Administration_Guide/Tasks_RHEV_Migration_Setting_Migration_Priority.html>.

"Vespa", IBM, printed on Apr. 7, 2016, 1 page, <http://researcher.watson.ibm.com/researcher/view_group.php?id=182>.

"VIOS configuration and tuning for optimum partition mobility performance", IBM, last updated on Dec. 16, 2015, 2 pages, <http://www.ibm.com/support/knowledgecenter/api/content/nl/en-us/Power8/p8hc3/p8hc3_viostune_lpmperf.htm?cp=POWER8%2F1-6-1-3-7-1-1-2-3>.

"VMotion", Virtual Machine Live Migration with vSphere vMotion: VMware | VMware India, printed on Apr. 7, 2016, 6 pages, <http://www.vmware.com/in/products/vsphere/features/vmotion.html>.

Mell et al., "The NIST Definition of Cloud Computing", National Institute of Standards and Technology, U.S. Department of Commerce, NIST Special Publication 800-145, Sep. 2011, 7 pages.

* cited by examiner

GUIDED VIRTUAL MACHINE MIGRATION

BACKGROUND OF THE INVENTION

The present invention relates generally to the field of virtualization, and more particularly to guided virtual machine migration.

The use of virtualization is becoming widespread. Virtualization describes a software abstraction that separates a computer resource and its use from an underlying physical device. Generally, a virtual machine (VM) provides a software execution environment and may have a virtual processor, virtual system memory, virtual storage, and various virtual devices. Virtual machines have the ability to accomplish tasks independent of particular hardware implementations or configurations. System virtualization is implemented through some managing functionality, typically hypervisor technology. Hypervisors, also called virtual machine managers (VMMs), use a thin layer of code in software or firmware to achieve fine-grained, dynamic resource sharing. Because hypervisors provide the greatest level of flexibility in how virtual resources are defined and managed, they are generally the primary technology for system virtualization.

Virtual machines may be migrated between a source host computing platform ("the source host") and a target host computing platform ("the target host") connected over a network, which may be a local area network or a wide area network that may include the Internet. Migration permits a clean separation between hardware and software, thereby improving facilities fault management, load balancing, and low-level system maintenance. Live migration permits an administrator to move a running virtual machine between different physical machines without disconnecting a running client or application program. For a successful live migration, memory, storage, and network connectivity of the virtual machine need to be migrated from the source host to the destination host.

In computing, hardware acceleration is the use of computer hardware to perform some functions faster than is possible in software running on a more general-purpose central processing unit (CPU). Examples of hardware acceleration include blitting acceleration functionality in graphics processing units (GPUs) and regular expression hardware acceleration for spam control in the server industry. The hardware that performs the acceleration, when in a separate unit from the CPU, is referred to as a hardware accelerator. Generally, processors are sequential, and instructions are executed one by one. Various techniques are used to improve performance; hardware acceleration is one of them. The main difference between hardware and software is concurrency, allowing hardware to be much faster than software. Hardware accelerators are designed for computationally intensive software code. Depending upon granularity, hardware acceleration can vary from a small functional unit to a large functional block.

SUMMARY

Embodiments of the present invention disclose a method, a computer program product, and a system for guided virtual machine migration. The method may include one or more computer processors determining a target host computer available for a migration of a virtual machine from a source host computer. The one or more computer processors identify one or more resources of the target host computer with one or more predictive errors. The one or more computer processors determine whether the virtual machine uses one or more of the identified one or more resources with one or more predictive errors. The one or more computer processors rank a migration path for the virtual machine from the source host computer to the target host computer with a designation. The one or more computer processors create a target host map, wherein the target host map indicates at least one migration path for the virtual machine from the source host computer to the target host computer.

DETAILED DESCRIPTION

A key feature that makes virtualization attractive is that of live migration. Live migration is a technology with which an entire running virtual machine (VM) is moved from one physical machine to another. Migration at the level of an entire VM means that active memory and execution state are transferred from the source to the destination. This allows seamless movement of online services without requiring clients to reconnect. Live migration of VMs and the standby mode of physical servers are automatically orchestrated by an algorithm engine. In general, the current approach to live migration requires a user to perform multiple validations and choose target servers based on the resources and other parameters on the target servers. Generally, there is no intelligence involved while migrating, i.e., the user may perform the migration manually or a policy may be set to migrate automatically at scheduled times. In addition, such VM migration techniques select target hosts only based on availability of processing capacity (e.g., CPU, memory, network bandwidth) of potential target hosts. Presently a mechanism is not in place to dynamically determine the best possible path for the VM migration based on additional criteria. This is key in cloud computing where evacuation of VMs for server maintenance or load balancing between servers becomes critical.

Embodiments of the present invention recognize that efficiency may be gained by implementing an engine that guides a user, such as a system administrator, through VM migration validation by providing a matrix of the best possible migration paths and target hosts based on the VM requirements, configuration, and server resources. Embodiments of the present invention categorize and rank available target hosts by validating performance requirements in terms of virtualized accelerators, thermal requirements of the VM, and availability of the target host considering predictive errors reported on memory devices and interfaces of the target host. Implementation of embodiments of the invention may take a variety of forms, and illustrative implementation details are discussed subsequently with reference to the Figures.

Figure 1:
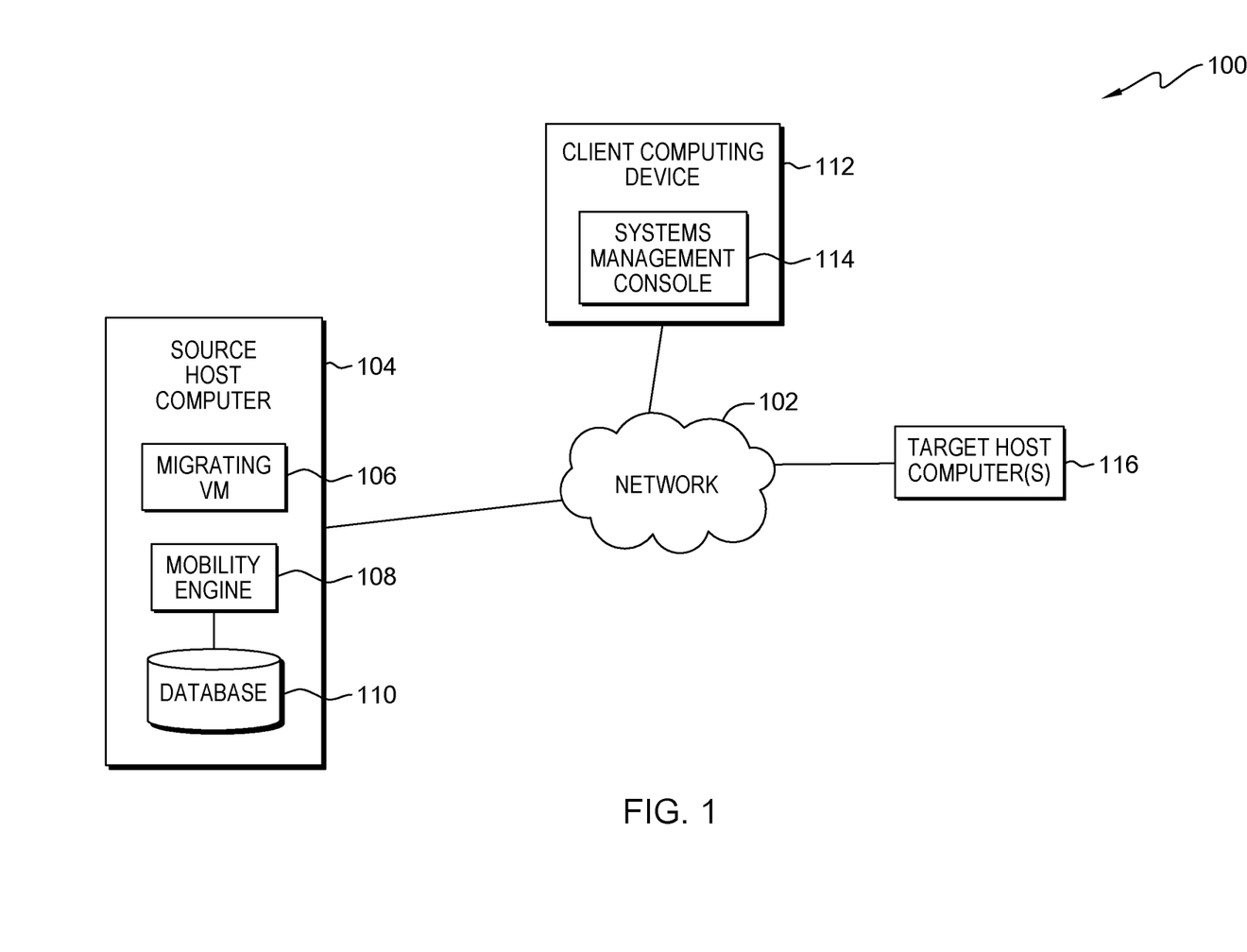
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes source host computer 104, client computing device 112, and target host computer(s) 116, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between source host computer 104, client computing device 112, target host computer(s) 116, and other computing devices (not shown) within distributed data processing environment 100.

Source host computer 104 can be a standalone computing device, a management server, a web server, a mobile computing device, or any other electronic device or computing system capable of receiving, sending, and processing data. In other embodiments, source host computer 104 can represent a server computing system utilizing multiple computers as a server system, such as in a cloud computing environment. In another embodiment, source host computer 104 can be a laptop computer, a tablet computer, a netbook computer, a personal computer (PC), a desktop computer, a personal digital assistant (PDA), a smart phone, or any programmable electronic device capable of communicating with client computing device 112, target host computer(s) 116, and other computing devices (not shown) within distributed data processing environment 100 via network 102. In another embodiment, source host computer 104 represents a computing system utilizing clustered computers and components (e.g., database server computers, application server computers, etc.) that act as a single pool of seamless resources when accessed within distributed data processing environment 100. Source host computer 104 includes migrating VM 106, mobility engine 108, and database 110. Source host computer 104 may include internal and external hardware components, as depicted and described in further detail with respect to FIG. 4.

Migrating VM 106 is an example of a virtual machine, which is a software implementation of a computer that executes programs like a physical machine. Migrating VM 106 resides on source host computer 104, but can be migrated, via live migration, to target host computer(s) 116, provided that target host computer(s) 116 have the appropriate resources to accept migrating VM 106 and maintain performance levels of both target host computer(s) 116 and migrating VM 106. In the depicted embodiment, migrating VM 106 resides on source host computer 104. In another embodiment, migrating VM 106 may reside elsewhere in distributed data processing environment 100.

Mobility engine 108 guides a user, such as a data center system administrator, toward choosing the best migration path for a VM. Mobility engine 108 determines whether target host computer(s) 116 meet basic resource requirements for a migrating VM, such as migrating VM 106. In addition, mobility engine 108 determines a thermal profile for target host computer(s) 116 based on thermal performance, and then determines whether migrating VM 106 can cause target host computer(s) 116 to breach a thermal threshold, either on a regular basis or during peak usage time periods. Mobility engine 108 also determines if migrating VM 106 uses a hardware accelerator on source host computer 104, and, if so, whether target host computer(s) 116 include a hardware accelerator. In addition, mobility engine 108 determines whether target host computer(s) 116 have reported any predictive errors, and, if so, whether migrating VM 106 uses the resources for which predictive errors have been reported. A predictive error indicates a system error event that has been automatically recovered or corrected by platform hardware and/or firmware. The frequency of predictive errors indicates a trend toward a potential unrecoverable platform error, requiring a deferred service or repair action. Mobility engine 108 performs the validation described above on one or more target host computer(s) 116, and presents the user with a map of the resulting ranking of the migration paths. In the depicted embodiment, mobility engine 108 resides on source host computer 104. In another embodiment, mobility engine 108 may reside elsewhere in distributed data processing environment 100, provided that mobility engine 108 has access to source host computer 104, client computing device 112, and target host computer(s) 116, via network 102. Mobility engine 108 is depicted and described in further detail with respect to FIG. 2.

Database 110 is a repository for data used by mobility engine 108. In the depicted embodiment, database 110 resides on source host computer 104. In another embodiment, database 110 may reside elsewhere within distributed data processing environment 100 provided mobility engine 108 and systems management console 114 have access to database 110. A database is an organized collection of data. Database 110 can be implemented with any type of storage device capable of storing data and configuration files that can be accessed and utilized by source host computer 104, such as a database server, a hard disk drive, or a flash memory. Database 110 stores data corresponding to a thermal profile of one or more target host computer(s) 116. Database 110 may also store historical VM resource usage data that may indicate the timing of peak usage periods. Database 110 may also store diagnostic reports generated by one or more target host computer(s) 116 that list predictive errors associated with memory devices, interfaces, or other resources that a migrating VM may utilize. Database 110 may also store basic resource requirements for one or more VMs to be considered during VM migration.

Client computing device 112 can be a laptop computer, a tablet computer, a smart phone, or any programmable electronic device capable of communicating with various components and devices within distributed data processing environment 100, via network 102. Client computing device 112 represents one or more client computing devices within distributed data processing environment 100. In general, client computing device 112 represents any programmable electronic device or combination of programmable electronic devices capable of executing machine readable program instructions and communicating with other computing devices (not shown) within distributed data processing environment 100 via a network, such as network 102. Client computing device 112 includes systems management console 114.

Systems management console 114 is a component of an operating system (OS) that provides system administrators and advanced users an interface for configuring, monitoring, and servicing a system. Systems management console 114 enables a system administrator to manage many systems and partitions. Systems management console 114 may include system analytics or diagnostics that enable systems management console 114 to determine whether system components are faulty. For example, systems management console 114 may determine whether one or more fans in a system are not operating properly. Systems management console 114 can store analytics or diagnostic information in database 110, via network 102. Systems management console 114 includes a graphic user interface (GUI) that can display the target host map or matrix determined by mobility engine 108.

Target host computer(s) 116 can be one or more of a standalone computing device, a management server, a web server, a mobile computing device, or any other electronic device or computing system capable of receiving, sending, and processing data. In other embodiments, target host computer(s) 116 can represent a server computing system utilizing multiple computers as a server system, such as in a cloud computing environment. In another embodiment, target host computer(s) 116 can be one or more of a laptop computer, a tablet computer, a netbook computer, a personal computer (PC), a desktop computer, a personal digital assistant (PDA), a smart phone, or any programmable electronic device capable of communicating with client computing device 112, source host computer 104, and other computing devices (not shown) within distributed data processing environment 100 via network 102. In another embodiment, target host computer(s) 116 represents a computing system utilizing clustered computers and components (e.g., database server computers, application server computers, etc.) that act as a single pool of seamless resources when accessed within distributed data processing environment 100.

Figure 2:
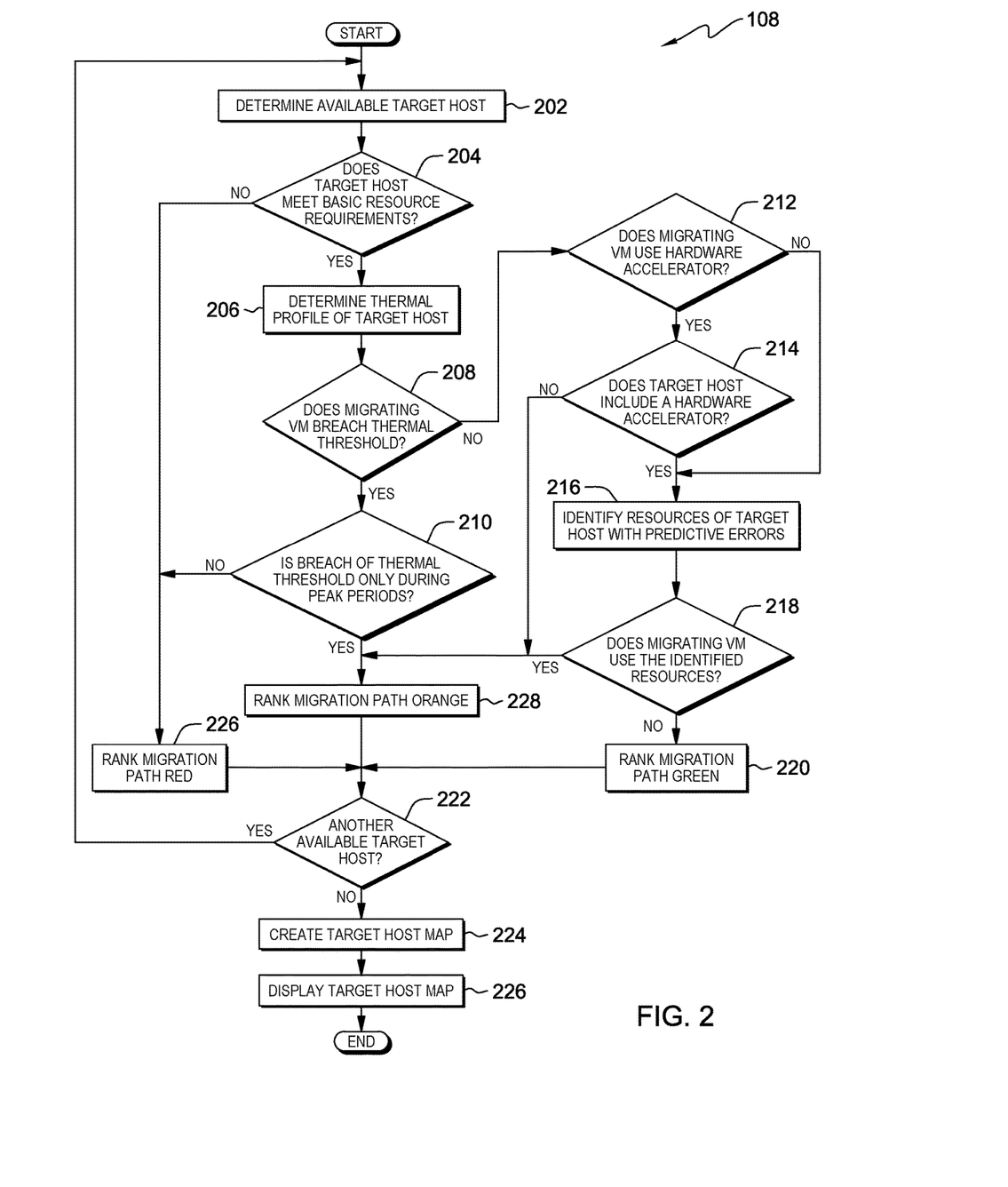
FIG. 2 is a flowchart depicting operational steps of a mobility engine, on a source host computer within the distributed data processing environment of FIG. 1, for guiding virtual machine migration, in accordance with an embodiment of the present invention.

FIG. 2 is a flowchart depicting operational steps of mobility engine 108, on source host computer 104 within distributed data processing environment 100 of FIG. 1, for guiding virtual machine migration, in accordance with an embodiment of the present invention.

Mobility engine 108 determines an available target host (step 202). After receiving a trigger, either from a user or a system, to begin a VM migration, mobility engine 108 chooses one of what may be a plurality of potential target hosts within distributed data processing environment 100, such as target host computer(s) 116, for validation and ranking. A VM migration process may be triggered by, for example, an existing policy, such as load balancing. The VM migration process may also be user-initiated, on-demand. The VM migration may also be system-initiated, based on factors such as predictive errors or system status in a high-availability environment.

Mobility engine 108 determines whether the target host meets basic resource requirements (decision block 204). As would be appreciated by one skilled in the art, basic resource requirements for a VM migration to a target host include, but are not limited to, storage capacity, CPU utilization, cost of migration, security risks, compatibility modes, processor architecture, resource availability, memory, and network availability. In an embodiment, basic resource requirement parameters are pre-defined by a system administrator. Depending on system architecture and performance goals, priority of the basic requirements may change. For example, maximum cost of migration may increase as the cost of computing resources increases.

If mobility engine 108 determines the target host does not meet basic resource requirements ("no" branch, decision block 204), then mobility engine 108, in the depicted embodiment, ranks the migration path as red (step 226). Mobility engine 108 creates a ranking of each available target host. The ranking includes a designation of order. For example, the designation may be a number, such as one, two or three. In another example, the designation may be a word, such as high, medium or low, or good, better or best. In the depicted embodiment, mobility engine 108 ranks each migration path and associated target host by designating a color: red, orange, or green. In the depicted embodiment, red represents a path or host that does not meet requirements of migrating VM 106 or target host computer(s) 116. Green represents a path or host that meets requirements and allows the migrated VM to function with minimized performance restrictions or limitations, i.e., few or none. Orange represents a path or host that can allow a migrated VM to function, but with some performance restrictions or limitations. In another embodiment, different colors may be used, as long as the colors are different from each other. Performance restrictions and limitations may include, but are not limited to, increased CPU resource usage on target host computer(s) 116, rate-limited processing by target host computer(s) 116, reduced performance of migrating VM 106, a need to migrate migrating VM 106 again in the future to accommodate peak usage requirements, available memory, a maximum number of VMs that can be hosted, etc. In one embodiment, a system administrator sets threshold limits for performance restrictions and limitations for each ranking level. For example, a green ranking, or minimized performance restrictions or limitations, may be defined as a migration path or target host computer that meets at least 98 percent of requirements. Continuing the example, an orange ranking, or some performance restrictions or limitations, may be defined as a migration path or target host that meets between 75 and 97 percent of requirements, and a red ranking may be defined as a migration path or target host that meets less than 75 percent of requirements.

If mobility engine 108 determines the target host does meet basic resource requirements ("yes" branch, decision block 204), then mobility engine 108 determines a thermal profile of the target host (step 206). Migrating a VM to a target host can alter the thermal profile, i.e., the thermal characteristics, of the target host system. The system generates heat due to usage of various components. The system design incorporates an acceptable operating temperature range, and a threshold temperature at which action is taken to prevent exceeding a high temperature limit. In general, large computer systems include various means of controlling the operating temperature, such as heat sinks on semiconductor packages and system fans. In some embodiments, systems management console 114 monitors the thermal profile, collects diagnostics of the status of the fans and stores the data in database 110. If, for example, one or more of the fans in the system are faulty, adding a VM to the system may compromise the thermal profile, i.e., may cause the thermal profile to tend toward the high end of the acceptable range temperature. Mobility engine 108 determines the thermal profile for the target host prior to the addition of migrating VM 106.

Mobility engine 108 determines whether migrating VM 106 breaches a thermal threshold (decision block 208). If mobility engine 108 determines the current thermal profile of target host computer(s) 116 is toward the high end of the acceptable temperature range, then the addition of migrating VM 106 may cause the system temperature to rise above a threshold temperature of the acceptable range. Mobility engine 108 retrieves the average computing resource usage of migrating VM 106 on source host computer 104 from database 110 and applies that value to target host computer(s) 116 to determine whether adding migrating VM 106 to target host computer(s) 116 causes a breach of the thermal threshold.

If mobility engine 108 determines migrating VM 106 breaches a thermal threshold ("yes" branch, decision block 208), then mobility engine 108 determines whether the thermal threshold breach is only during peak periods (decision block 210). Some applications on migrating VM 106 may use maximum, or near maximum, resources during particular time periods. For example, use of an application may increase during a holiday shopping period, or for end of month transactions. Mobility engine 108 analyzes the use history of migrating VM 106 and determines whether there are any upcoming events or days when resources of migrating VM 106 may be at peak usage. Mobility engine 108 determines whether the breach of a thermal threshold is a periodic occurrence, i.e., the breach would not occur under normal circumstances.

If mobility engine 108 determines the thermal threshold breach is only during peak periods ("yes" branch, decision block 210), then mobility engine 108 ranks the migration path as orange (step 228). If the breach of the thermal threshold is only during peak periods, then it is possible to migrate the VM back to source host computer 104, or another of target host computer(s) 116, before the peak period occurs. Thus mobility engine 108 determines the migration path includes some limitations. If mobility engine 108 determines the thermal threshold breach is not only during peak periods ("no" branch, decision block 210), then mobility engine 108 ranks the migration path as red (step 226). If the breach of the thermal threshold, after migrating the VM, would occur at a regular frequency, then mobility engine 108 determines that the migration path is unacceptable. For example, if migrating VM 106 runs a banking application, and every day at 5:00 p.m., the application utilizes maximum CPU resources, then mobility engine 108 ranks the migration path as red.

If mobility engine 108 determines migrating VM 106 does not breach a thermal threshold ("no" branch, decision block 208), then mobility engine 108 determines whether migrating VM 106 uses a hardware accelerator (decision block 212). Some software applications are built in such a way that if functions are implemented as hardware accelerators in the system, the operating system routes the operations to the accelerators. In the absence of accelerators, the operating system routes the operations to a software version of the function which uses CPU resources. If migrating VM 106 uses a hardware accelerator on source host computer 104, then not having a hardware accelerator available on target host computer(s) 116 may degrade performance of target host computer(s) 116 due to additional CPU usage. In one embodiment, mobility engine 108 ranks the migration path as green as a result of determining migrating VM 106 does not breach a thermal threshold.

If mobility engine 108 determines migrating VM 106 uses a hardware accelerator ("yes" branch, decision block 212), then mobility engine 108 determines whether the target host includes a hardware accelerator (decision block 214).

If mobility engine 108 determines the target host does not include a hardware accelerator ("no" branch, decision block 214), then mobility engine 108 ranks the migration path as orange (step 228). If target host computer(s) 116 do not include a hardware accelerator, then migrating VM 106 may be able to operate without the accelerator, however the addition of migrating VM 106 may reduce performance of target host computer(s) 116.

If mobility engine 108 determines migrating VM 106 does not use a hardware accelerator ("no" branch, decision block 212), or if mobility engine 108 determines the target host includes a hardware accelerator ("yes" branch, decision block 214), then mobility engine 108 identifies any resources of the target host with predictive errors (step 216). Target host computer(s) 116 may have reported predictive errors on memory devices, memory interfaces, or other resources which migrating VM 106 may use. For example, system diagnostics, such as may be included in systems management console 114, can detect faults which may arise in a dual inline memory module (DIMM). The system diagnostics can track DIMM availability and determine, i.e., predict, based on a number of faults detected, whether additional faults are likely that may cause the DIMM to be unusable. The system diagnostics can flag the system if a DIMM availability goes below a pre-defined threshold. The system may isolate the faulty DIMM such that the system does not use the DIMM, or uses the DIMM at a lower frequency than before the DIMM was diagnosed as faulty. In one embodiment, mobility engine 108 retrieves diagnostic information from database 110 to identify any resources with predictive errors. In one embodiment, mobility engine 108 ranks the migration path as green as a result of determining the migrating VM 106 does not use a hardware accelerator or that the target host includes a hardware accelerator.

Mobility engine 108 determines whether migrating VM 106 uses any of the identified resources (decision block 218). Mobility engine 108 may access the system diagnostics of target host computer(s) 116, stored in database 110 by systems management console 114, to determine whether migrating VM 106 uses any of the resources identified to have predictive errors on target host computer(s) 116.

If mobility engine 108 determines migrating VM 106 uses the identified resources ("yes" branch, decision block 218), then mobility engine 108 ranks the migration path as orange (step 228). Mobility engine 108 determines that although migrating VM 106 uses one or more resources identified with predictive errors, target host computer(s) 116 can accept migrating VM 106, but there may be limitations on performance due to the resources reporting predictive errors failing, and putting a high-availability state of migrating VM 106 in jeopardy. If mobility engine 108 determines migrating VM 106 does not use the identified resources ("no" branch, decision block 218), then mobility engine 108 ranks the migration path as green (step 220). Mobility engine 108 determines that the migration path to the target host in the current validation, as well as the target host itself, can allow the migrated VM to function with minimized performance restrictions on the migrated VM or the target host computer.

In an embodiment where mobility engine 108 ranks each criterion of a migration path or target host individually, mobility engine 108 determines an overall ranking by combining the rankings of each individual criterion and choosing the lowest common denominator. For example, if one criterion is ranked red while other criterion are ranked green or orange, then mobility engine 108 ranks the migration path or target host as red. If one criterion is ranked orange while the remaining criterion are ranked green, then mobility engine 108 ranks the migration path or target host as orange. If all criteria are ranked green, then mobility engine 108 ranks the migration path or target host as green.

Mobility engine 108 determines whether there is another available target host (decision block 222). After completing a validation of one target host, mobility engine 108 determines whether there is an additional available target host to consider for migrating VM 106. If mobility engine 108 determines there is another available target host ("yes" branch, decision block 222), then mobility engine 108 returns to step 202.

If mobility engine 108 determines there is not another available target host ("no" branch, decision block 222), then mobility engine 108 creates a target host map (step 224). After completing the validation, i.e., reviewing and ranking the available target hosts, mobility engine 108 aggregates the rankings and creates a target host map that indicates the status of each validated migration path. In one embodiment, after creating the map, if mobility engine 108 determines there is only one green migration path, then mobility engine 108 triggers the migration of migrating VM 106 to the target host computer via the green migration path.

Mobility engine 108 displays the target host map (step 226). After creating the target host map based on the results of the validation, mobility engine 108 displays the results to a user via systems management console 114. In one embodiment, mobility engine 108 displays the results as a map, with arrows pointing from a listed migrating VM to a potential target host. In another embodiment, mobility engine 108 may display the results in a tabular format. An example target host map is depicted and described in further detail with respect to FIG. 3.

Figure 3:
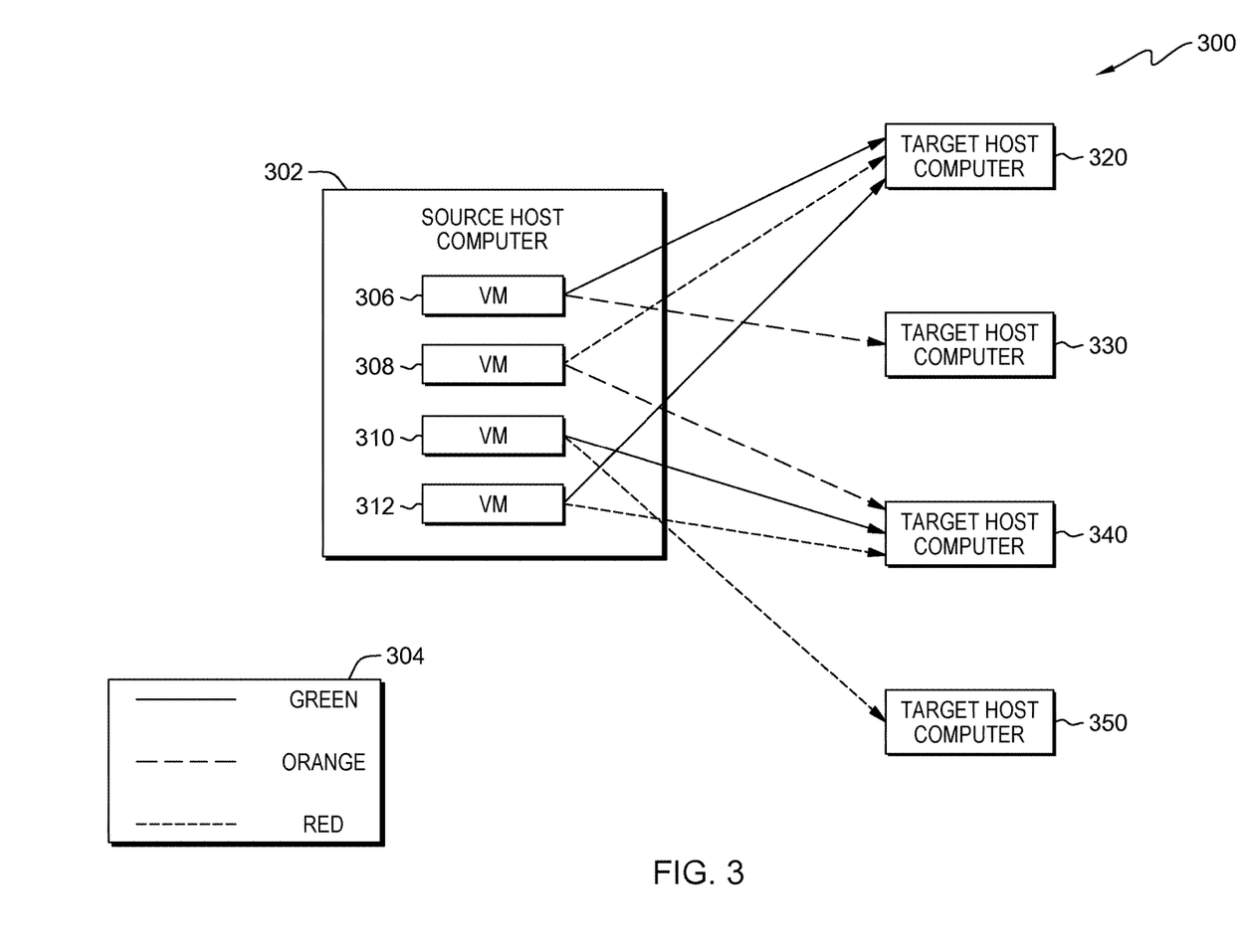
FIG. 3 illustrates an example of a target host map, displayed on a client computing device within the distributed data processing environment of FIG. 1, in accordance with an embodiment of the present invention.

FIG. 3 illustrates example target host map 300, displayed on client computing device 112 within distributed data processing environment 100 of FIG. 1, in accordance with an embodiment of the present invention.

FIG. 3 includes source host computer 302 and legend 304. Source host computer 302 includes four migrating VMs: VM 306, VM 308, VM 310, and VM 312. FIG. 3 also includes four target hosts: target host computer 320, target host computer 330, target host computer 340, and target host computer 350. The arrows pointing from a migrating VM to a target host computer represent a possible migration path. Legend 304 indicates whether the arrows represent green, orange, or red migration paths. In one embodiment, the displayed arrows are the color they represent, and legend 304 is not present. Mobility engine 108 has determined the ranking of the migration paths based on thermal requirements, hardware accelerator usage and predictive errors, as discussed with respect to FIG. 2. The display of the target host map enables a user to visually determine which migration paths have some performance limitations, i.e., orange paths, or minimized performance limitations, i.e., green paths. In one embodiment, the target host map may include pop-up boxes, such that a user can click on an orange or red path and a box is displayed that includes a description of why mobility engine 108 categorized the path as orange or red. In one embodiment, a user may click on a path in order to reserve resources on the target host. In the embodiment, mobility engine 108 may offer the user the ability to include additional detail for the reserved resources, such as at what time the migration is anticipated to occur, or for how long to keep the resource reserved. In one embodiment, a user may click on a migration path and mobility engine 108 triggers an immediate VM migration.

Figure 4:
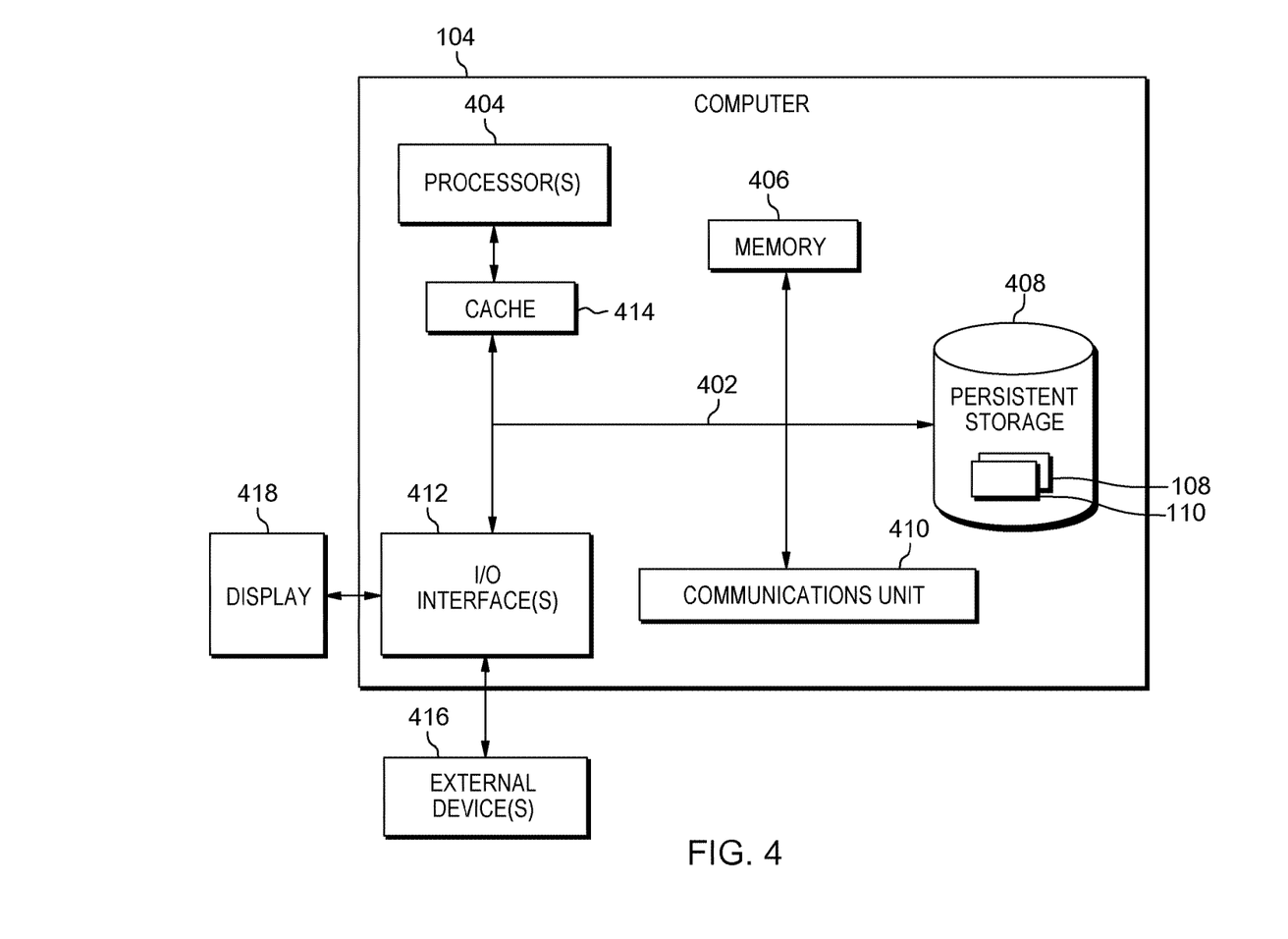
FIG. 4 depicts a block diagram of components of the source host computer executing the mobility engine within the distributed data processing environment of FIG. 1, in accordance with an embodiment of the present invention.

FIG. 4 depicts a block diagram of components of source host computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Source host computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., mobility engine 108 and database 110, can be stored in persistent storage 408 for execution and/or access by one or more of the respective processor(s) 404 of source host computer 104 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 112 and target host computer(s) 116. In these examples, communications unit 410 includes one or more network interface cards. Communications unit 410 may provide communications through the use of either or both physical and wireless communications links. Mobility engine 108, and other programs and data used for implementation of the present invention, may be downloaded to persistent storage 408 of source host computer 104 through communications unit 410.

I/O interface(s) 412 allows for input and output of data with other devices that may be connected to source host computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., mobility engine 108 and database 110 on source host computer 104, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
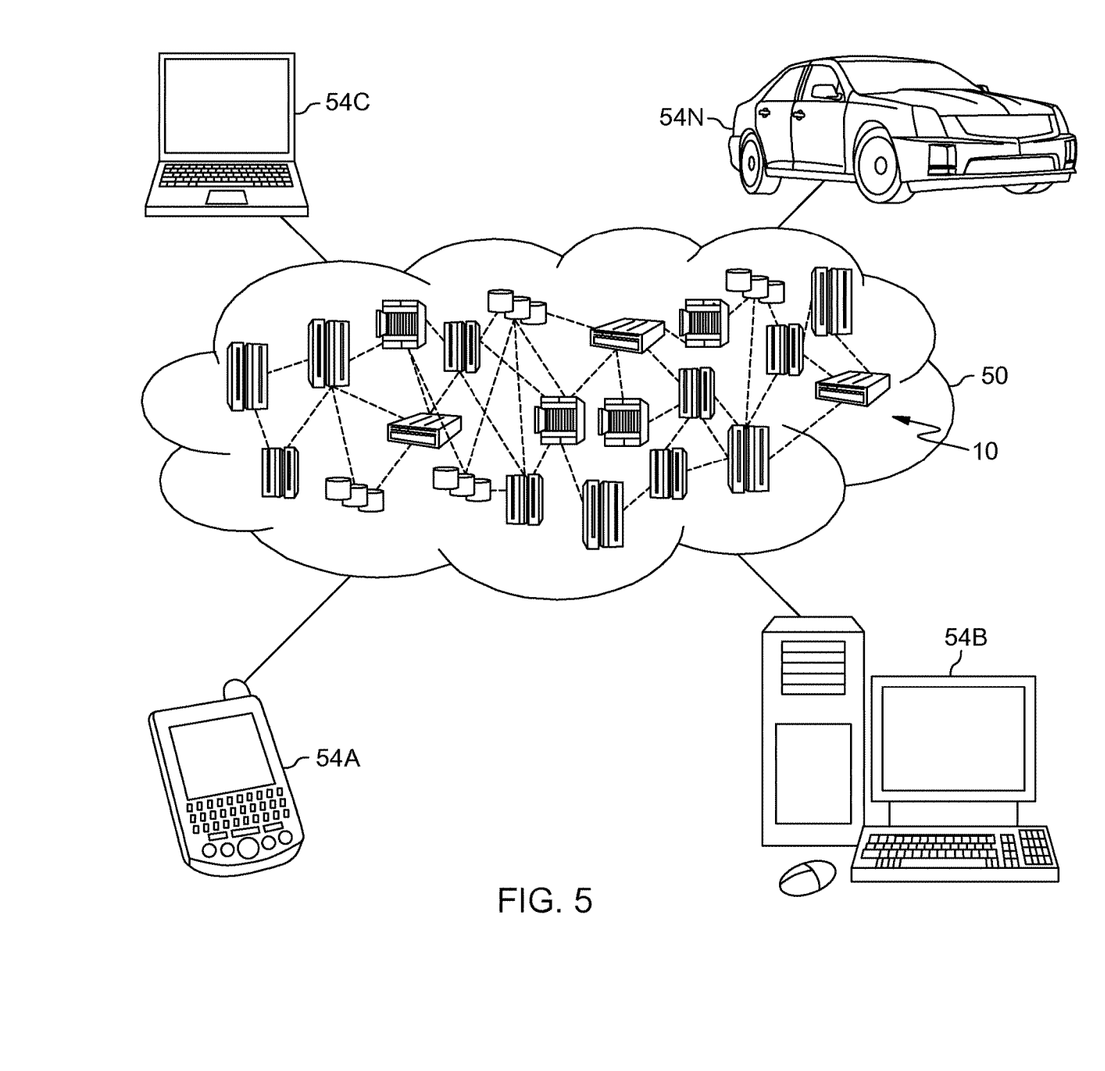
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Figure 6:
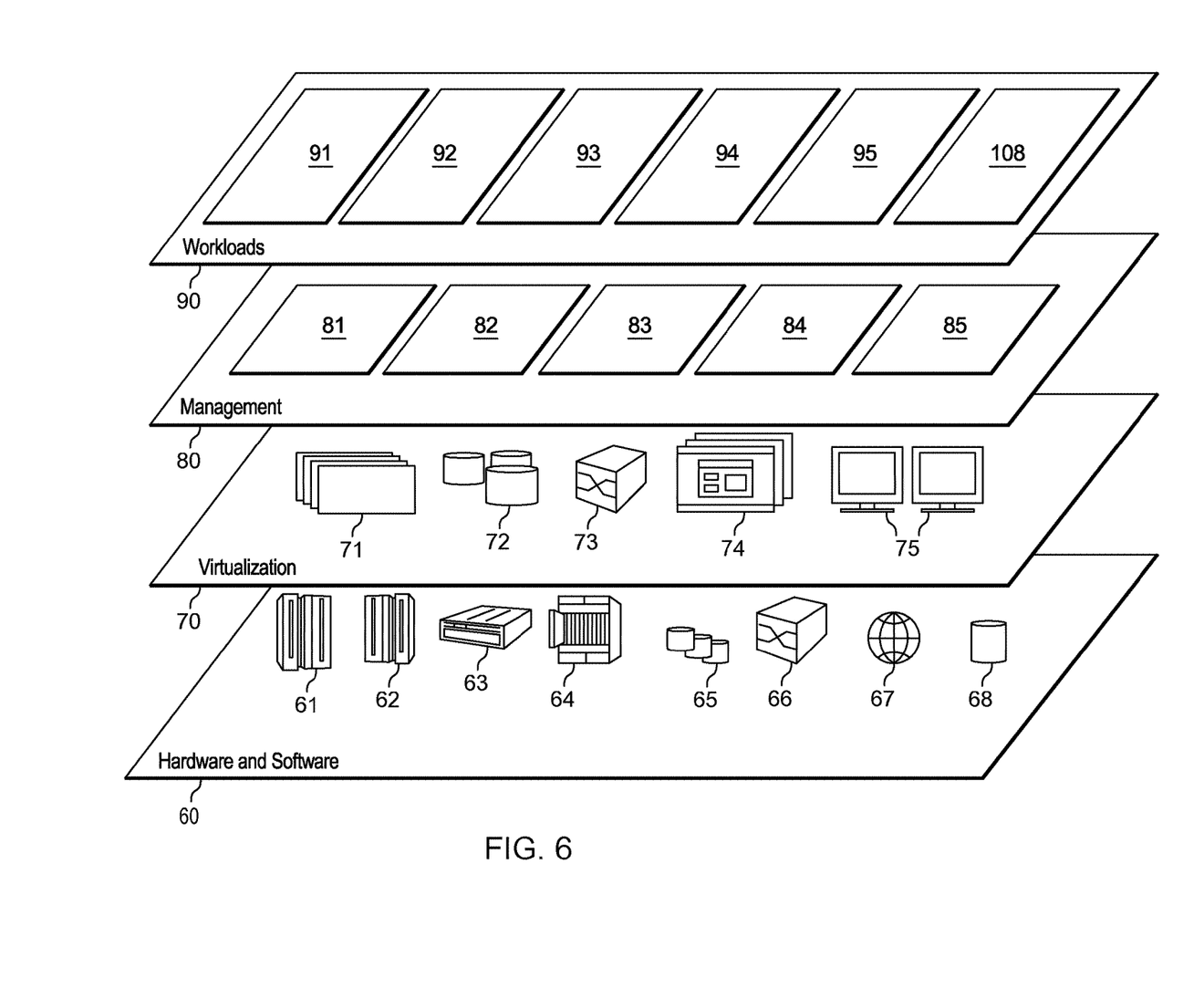
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobility engine 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for guided virtual machine migration, the method comprising:
    determining, by one or more computer processors, a first target host computer available for a migration of a virtual machine from a first source host computer;
    identifying, by the one or more computer processors, one or more resources with one or more predictive errors, wherein the one or more resources are located on the first target host computer, and wherein a predictive error indicates a resource error event that has been automatically recovered;
    determining, by the one or more computer processors, whether the virtual machine uses one or more of the identified one or more resources with one or more predictive errors;
    responsive to determining the virtual machine does not use one or more of the identified one or more resources with one or more predictive errors, ranking, by the one or more computer processors, a migration path for the virtual machine from the first source host computer to the first target host computer with a first designation of at least three designations, wherein the first designation represents a target host computer that allows a migrated virtual machine to function with minimized performance restrictions, and wherein a second designation represents a target host computer that allows a migrated virtual machine to function with one or more performance restrictions based on a thermal threshold of the first target host computer, and wherein a third designation represents a target host computer that does not meet requirements of a migrated virtual machine;
    creating, by the one or more computer processors, based, at least in part, on the ranking, a target host map, wherein the target host map indicates at least one migration path for the virtual machine from the first source host computer to the first target host computer; and
    triggering, by the one or more computer processors, a migration of the virtual machine to the first target host computer.

2. The method of claim 1, further comprising:
    determining, by one or more computer processors, a thermal profile of the first target host computer;
    determining, by the one or more computer processors, whether the migration of the virtual machine from the first source host computer to the first target host computer will breach the thermal threshold of the determined thermal profile of the first target host computer; and
    responsive to determining the migration of the virtual machine from the first source host computer to the first target host computer will not breach the thermal threshold of the determined thermal profile of the first target host computer, ranking, by the one or more computer processors, the migration path for the virtual machine from the first source host computer to the first target host computer with the first designation.

3. The method of claim 2, further comprising:
    responsive to determining the migration of the virtual machine from the first source host computer to the first target host computer will breach the thermal threshold of the first target host computer, determining, by the one or more computer processors, whether the migration of the virtual machine from the first source host computer to the first target host computer will breach the thermal threshold of the first target host computer only during one or more peak usage time periods; and responsive to determining the migration of the virtual machine from the first source host computer to the first target host computer will breach the thermal threshold of the first target host computer only during one or more peak usage time periods, ranking, by the one or more computer processors, the migration path for the virtual machine from the first source host computer to the first target host computer with the second designation.

4. The method of claim 3, wherein peak usage time periods include one or more particular periods of time when one or more applications on the virtual machine use at least one of maximum resources and near maximum resources of the first target host computer.

5. The method of claim 3, further comprising, responsive to determining the migration of the virtual machine from the first source host computer to the first target host computer will not breach the thermal threshold of the first target host computer only during peak usage time periods, ranking, by the one or more computer processors, the migration path for the virtual machine from the first source host computer to the first target host computer with the third designation.

6. The method of claim 1, further comprising:
determining, by the one or more computer processors, whether the virtual machine uses one or more hardware accelerators of the first source host computer;
responsive to determining the virtual machine uses one or more hardware accelerators of the first source host computer, determining, by the one or more computer processors, whether the first target host computer includes one or more hardware accelerators; and
responsive to determining the first target host computer includes one or more hardware accelerators, ranking, by the one or more computer processors, the migration path for the virtual machine from the first source host computer to the first target host computer with the first designation.

7. The method of claim 6, further comprising, responsive to determining the first target host computer does not include one or more hardware accelerators, ranking, by the one or more computer processors, the migration path for the virtual machine from the first source host computer to the first target host computer with the second designation.

8. The method of claim 1, further comprising, responsive to determining the virtual machine uses one or more of the identified one or more memory devices with one or more predictive errors, ranking, by the one or more computer processors, the migration path for the virtual machine from the first source host computer to the first target host computer with the second designation.

9. The method of claim 1, further comprising:
determining, by the one or more computer processors, whether the first target host computer meets resource requirements for a migration of the virtual machine from the first source host computer to the first target host computer, wherein resource requirements include one or more of: a storage capacity, a CPU utilization, a cost of migration, one or more security risks, one or more compatibility modes, a processor architecture, a resource availability, a memory, or a network availability; and
responsive to determining the first target host computer does not meet resource requirements for a migration of the virtual machine from the first source host computer to the first target host computer, ranking, by the one or more computer processors, the migration path for the virtual machine from the first source host computer to the first target host computer with the third designation.

10. The method of claim 1, wherein the first designation is green, and wherein the second designation is orange, and wherein the third designation is red.

11. A computer program product for guided virtual machine migration, the computer program product comprising:
one or more computer readable storage devices and program instructions stored on the one or more computer readable storage devices, the stored program instructions comprising:
program instructions to determine a first target host computer available for a migration of a virtual machine from a first source host computer;
program instructions to identify one or more resources with one or more predictive errors, wherein the one or more resources ices are located on the first target host computer, and, wherein a predictive error indicates a system error event that has been automatically recovered;
program instructions to determine whether the virtual machine uses one or more of the identified one or more resources ices with one or more predictive errors;
responsive to determining the virtual machine does not use one or more of the identified one or more resources with one or more predictive errors, program instructions to rank a migration path for the virtual machine from the first source host computer to the first target host computer with a first designation of at least three designations, wherein the first designation represents a host computer that allows a migrated virtual machine to function with minimized performance restrictions, and wherein a second designation represents a host computer that allows a migrated virtual machine to function with one or more performance restrictions based on a thermal threshold of the first target host computer, and wherein a third designation represents a host computer that does not meet requirements of a migrated virtual machine;
program instructions to create, based, at least in part, on the ranking, a target host map, wherein the target host map indicates at least one migration path for the virtual machine from the first source host computer to the first target host computer; and
program instructions to trigger a migration of the virtual machine to the first target host computer.

12. The computer program product of claim 11, the stored program instructions further comprising:
program instructions to determine a thermal profile of the first target host computer;
program instructions to determine whether the migration of the virtual machine from the first source host computer to the first target host computer will breach the thermal threshold of the determined thermal profile of the first target host computer; and
responsive to determining the migration of the virtual machine from the first source host computer to the first target host computer will not breach the thermal threshold of the determined thermal profile of the first target host computer, program instructions to rank the migration path for the virtual machine from the first source host computer to the first target host computer with the first designation.

13. The computer program product of claim 12, the stored program instructions further comprising:

responsive to determining the migration of the virtual machine from the first source host computer to the first target host computer will breach a thermal threshold of the first target host computer, program instructions to determine whether the migration of the virtual machine from the first source host computer to the first target host computer will breach the thermal threshold of the first target host computer only during one or more peak usage time periods; and responsive to determining the migration of the virtual machine from the first source host computer to the first target host computer will breach the thermal threshold of the first target host computer only during one or more peak usage time periods, program instructions to rank the migration path for the virtual machine from the first source host computer to the first target host computer with the second designation.

14. The computer program product of claim 13, the stored program instructions further comprising, responsive to determining the migration of the virtual machine from the first source host computer to the first target host computer will not breach the thermal threshold of the first target host computer only during peak usage time periods, program instructions to rank the migration path for the virtual machine from the first source host computer to the first target host computer with the third designation.

15. The computer program product of claim 11, the stored program instructions further comprising:
program instructions to determine whether the virtual machine uses one or more hardware accelerators of the first source host computer;
responsive to determining the virtual machine uses one or more hardware accelerators of the first source host computer, program instructions to determine whether the first target host computer includes one or more hardware accelerators; and
responsive to determining the first target host computer includes one or more hardware accelerators, program instructions to rank the migration path for the virtual machine from the first source host computer to the first target host computer with the first designation.

16. The computer program product of claim 15, the stored program instructions further comprising, responsive to determining the first target host computer does not include one or more hardware accelerators, program instructions to rank the migration path for the virtual machine from the first source host computer to the first target host computer with the second designation.

17. The computer program product of claim 11, the stored program instructions further comprising, responsive to determining the virtual machine uses one or more of the identified one or more resources with one or more predictive errors, program instructions to rank the migration path for the virtual machine from the first source host computer to the first target host computer with the second designation.

18. A computer system for guided virtual machine migration, the computer system comprising:
one or more computer processors;
one or more computer readable storage device;
program instructions stored on the one or more computer readable storage devices for execution by at least one of the one or more computer processors, the stored program instructions comprising:
program instructions to program instructions to determine a first target host computer available for a migration of a virtual machine from a first source host computer;
program instructions to identify one or more resources with one or more predictive errors, wherein the one or more resources are located on the first target host computer, and, wherein a predictive error indicates a system error event that has been automatically recovered;
program instructions to determine whether the virtual machine uses one or more of the identified one or more resources vices with one or more predictive errors;
responsive to determining the virtual machine does not use one or more of the identified one or more resources with one or more predictive errors, program instructions to rank a migration path for the virtual machine from the first source host computer to the first target host computer with a first designation of at least three designations, wherein the first designation represents a host computer that allows a migrated virtual machine to function with minimized performance restrictions, and wherein a second designation represents a host computer that allows a migrated virtual machine to function with one or more performance restrictions based on a thermal threshold of the first target host computer, and wherein a third designation represents a host computer that does not meet requirements of a migrated virtual machine;
program instructions to create, based, at least in part, on the ranking, a target host map, wherein the target host map indicates at least one migration path for the virtual machine from the first source host computer to the first target host computer; and
program instructions to trigger a migration of the virtual machine to the first target host computer.

19. The computer system of claim 18, the stored program instructions further comprising:
program instructions to determine a thermal profile of the first target host computer;
program instructions to determine whether the migration of the virtual machine from the first source host computer to the first target host computer will breach the thermal threshold of the determined thermal profile of the first target host computer; and
responsive to determining the migration of the virtual machine from the first source host computer to the first target host computer will not breach the thermal threshold of the determined thermal profile of the first target host computer, program instructions to rank the migration path for the virtual machine from the first source host computer to the first target host computer with the first designation.

20. The computer system of claim 18, the stored program instructions further comprising:
program instructions to determine whether the virtual machine uses one or more hardware accelerators of the first source host computer;
responsive to determining the virtual machine uses one or more hardware accelerators of the first source host computer, program instructions to determine whether the first target host computer includes one or more hardware accelerators; and
responsive to determining the first target host computer includes one or more hardware accelerators, program instructions to rank the migration path for the virtual machine from the first source host computer to the first target host computer with the first designation.

* * * * *